(12) United States Patent
Noguchi et al.

(10) Patent No.: US 8,093,311 B2
(45) Date of Patent: Jan. 10, 2012

(54) INK FOR INK-JET RECORDING

(75) Inventors: Akiko Noguchi, Komaki (JP); Takashi Kawaguchi, Aichi-ken (JP)

(73) Assignee: Brother Kogyo Kabushiki Kaisha, Aichi-Ken (JP)

( * ) Notice: Subject to any disclaimer, the term of this patent is extended or adjusted under 35 U.S.C. 154(b) by 1423 days.

(21) Appl. No.: 11/368,303

(22) Filed: Mar. 2, 2006

(65) Prior Publication Data

US 2006/0205839 A1   Sep. 14, 2006

(30) Foreign Application Priority Data

Mar. 9, 2005   (JP) ................. 2005-066405

(51) Int. Cl.
| | |
|---|---|
| *C08J 3/00* | (2006.01) |
| *C08K 5/06* | (2006.01) |
| *C09D 5/00* | (2006.01) |
| *C09D 11/00* | (2006.01) |
| *C09D 11/10* | (2006.01) |
| *C09J 7/02* | (2006.01) |
| *B32B 3/00* | (2006.01) |
| *B32B 5/02* | (2006.01) |
| *B32B 5/12* | (2006.01) |
| *B32B 9/00* | (2006.01) |
| *B32B 9/04* | (2006.01) |
| *B32B 27/04* | (2006.01) |
| *B41J 2/01* | (2006.01) |
| *B41J 2/17* | (2006.01) |
| *B41M 5/025* | (2006.01) |
| *G01D 11/00* | (2006.01) |

(52) U.S. Cl. ........ 523/160; 523/161; 524/366; 524/377; 347/1; 347/95; 347/100; 428/321.3; 428/411.1; 442/58; 442/59

(58) Field of Classification Search ................. 523/160, 523/161; 524/366, 377; 428/411.1, 321.3; 347/1, 95, 100; 442/58, 59
See application file for complete search history.

(56) References Cited

U.S. PATENT DOCUMENTS

| | | | |
|---|---|---|---|
| 7,296,883 B2 | 11/2007 | Kanaya et al. | |
| 7,371,274 B2 | 5/2008 | Sanada et al. | |
| 2005/0007432 A1* | 1/2005 | Kanaya et al. | ................ 347/100 |
| 2005/0024458 A1 | 2/2005 | Sanada et al. | |

FOREIGN PATENT DOCUMENTS

| | | |
|---|---|---|
| JP | 10279851 | 10/1998 |
| JP | 2001-81372 | 3/2001 |
| JP | 2003-335986 | 11/2003 |
| WO | WO 2004/029164 | 4/2004 |
| WO | WO 2004/061023 | 7/2004 |

* cited by examiner

*Primary Examiner* — Patrick Niland
(74) *Attorney, Agent, or Firm* — Frommer Lawrence & Haug LLP

(57) ABSTRACT

A pigment ink for ink-jet recording which is excellent in freezing resistance and fixability includes a pigment, an aqueous resin emulsion, polyethylene glycol and diethylene glycol. This ink satisfies the following formulae (1), (2) and (3):

$$A<15 \tag{1}$$

$$A+B>10 \tag{2}$$

$$30 \leq A \times \alpha + B \leq 64 \tag{3}$$

wherein: A is the content of polyethylene glycol (%); B is the content of diethylene glycol (%); and α is the molecular weight ratio of polyethylene glycol to diethylene glycol.

10 Claims, No Drawings

INK FOR INK-JET RECORDING

BACKGROUND OF THE INVENTION

1. Field of the Invention

The present invention relates to an ink for ink-jet recording which is excellent in freezing resistance and fixability.

2. Description of the Related Art

Conventionally, an ink containing as a coloring agent a water soluble dye dispersed into an aqueous medium has generally been employed as an ink for ink-jet recording. Recently, in view of weather fastness and water resistance, a pigment ink has also been employed in which a pigment is employed in place of a water soluble dye.

In a pigment ink, an aqueous resin emulsion has been employed in order to improve the dispersibility and the fixability of pigment, and in particular to improve the washing fastness when the ink is employed for printing on cloth (see Japanese Patent Application Laid-Open No. 2003-335986).

However, a conventional ink for ink-jet recording containing an aqueous resin emulsion freezes at −5° C. to −10° C. Thus, when the ink is transported to, for example, cold districts, the ink freezes to cause the emulsion to be destroyed. In this case, even when the ink is brought back to room temperature, the desired ink properties are not recovered.

In order to address the freezing problem, an ink has been proposed in which a specified polyoxyethylene alkyl ether sulfate is employed as a dispersing agent (see Japanese Patent Application Laid-Open No. 2001-81372).

SUMMARY OF THE INVENTION

Accordingly, it is an object of the present invention to provide an ink for ink-jet recording excellent in freezing resistance and fixability at low cost, even when employing a more general purpose ink material in a pigment ink.

The present inventors have found that, in an ink for ink-jet recording containing a pigment, an aqueous resin emulsion, polyethylene glycol and diethylene glycol, the above-mentioned object can be achieved by adjusting the contents of polyethylene glycol and diethylene glycol to satisfy a certain relation.

Therefore, the present invention provides an ink for ink-jet recording comprising a pigment, an aqueous resin emulsion, polyethylene glycol and diethylene glycol. The ink for ink-jet recording satisfies the following formulae (1), (2) and (3):

$$A < 15 \quad (1)$$

$$A + B > 10 \quad (2)$$

$$30 \leq A \times \alpha + B \leq 64 \quad (3)$$

wherein: A is a content of polyethylene glycol (mass %); B is a content of diethylene glycol (mass %); and α is a molecular weight ratio of polyethylene glycol to diethylene glycol.

In order to prevent drying of the ink and clogging thereof in an ink-jet head and to adjust the viscosity of the ink, the ink for ink-jet recording of the present invention contains polyethylene glycol and diethylene glycol as a water-soluble organic solvent.

Polyethylene glycol exhibits a high viscosity enhancing effect. However, if the content of polyethylene glycol is excessively high, the fixability of the ink deteriorates. As for diethylene glycol, the higher the content thereof, the more preferable for preventing drying of the ink. However, if the content of diethylene glycol is excessively high, the fixability is adversely affected, though not as much as in the case of polyethylene glycol.

In the ink of the present invention, the content of polyethylene glycol is less than 15 mass %. Thus, the viscosity of the ink is moderately increased with the effect of polyethylene glycol on the fixability suppressed within an allowable range.

Further, the ink of the present invention satisfies the formulae (2) and (3) and thus exhibits both excellent freezing resistance and fixability. In particular, the ink of the present invention exhibits excellent fixability also on cloth. Therefore, when the ink is printed on cloth, the obtained printed object exhibits excellent washing fastness.

In addition, the ink of the present invention is produced by combining general purpose ink materials and thus can be produced at low cost.

DETAILED DESCRIPTION OF THE INVENTION

The present invention will next be described in detail. In the following description, "%" represents mass %, unless otherwise specified.

The ink for ink-jet recording of the present invention contains a pigment, an aqueous resin emulsion, polyethylene glycol and diethylene glycol.

In the ink of the present invention, an inorganic pigment or an organic pigment conventionally employed in an ink for ink-jet recording may be employed as the pigment without particular limitations. Examples of the organic pigment include: azo pigments such as azo lakes, insoluble azo pigments, condensation azo pigments, chelate azo pigments and the like; polycyclic pigments such as phthalocyanine pigments, perylene pigments, anthraquinone pigments, quinacridone pigments, dioxazine pigments, thioindigo pigments, isoindolinone pigments, quinophthalone pigments and the like; dye lakes such as basic reactive type lakes, acidic dye type lakes and the like; nitro pigments; nitroso pigments; aniline blacks; daylight fluorescent pigments; and the like. Examples of the inorganic pigment include titanium oxides, iron oxides, carbon blacks, and the like. In particular, in terms of enabling expression of vivid hue, C. I. Pigment Yellows 3, 4, 5, 7, 17, 50, 51, 81, 98, 105, 180 and the like are preferably employed as a yellow pigment. In addition, C. I. Pigment Reds 2, 3, 5, 16, 23, 31, 49, 57, 63, 122 and the like are preferably employed as a magenta pigment, and C. I. Pigment Blues 1, 2, 15:3, 16, 17 and the like are preferably employed as a cyan pigment.

If the particle size of the pigment is too small, the density of printing, the hiding property of the ink to a substrate, the dispersion stability of the pigment and the like are unsatisfactory. If the particle size is too large, an ink-jet head tends to be clogged, and the color vividness of the ink, the dispersion stability of the pigment and the like are unsatisfactory. Therefore, the average volume particle size is preferably approximately 50 nm to approximately 200 nm.

In view of color balance, the pigment concentration of the ink is preferably approximately 3 to approximately 5% for color pigments such as yellow magenta and cyan pigments. As for a black pigment, the higher the content thereof, the more preferable, since importance is placed on the density recordable on a recording medium. However, if the content of the black pigment is too high, the ejectability of the ink from an ink-jet head is lowered. Therefore, the content is preferably approximately 6% to approximately 10%.

The aqueous resin emulsion is blended as a binder which allows the pigment to be dispersed or fixed. In particular, when ink-jet printing is performed on cloth, the washing fastness can be improved by blending the aqueous resin emulsion.

Various emulsions of resins having a glass transition temperature of approximately 0° C. or lower may be employed as the aqueous resin emulsion. Specific examples of the aqueous resin emulsion include acrylic-based emulsions, urethane-based emulsions, polyester-based emulsions, polystyrene-based emulsions, combinations thereof and the like. Of these, acrylic-based emulsions are preferable.

No particular limitation is imposed on the properties of the aqueous resin emulsion, and anionic emulsions, cationic emulsions, nonionic emulsions and the like may be employed. In addition, any of micro-emulsions, gross emulsions, reactive emulsions, emulsions of a room temperature crosslinking type, emulsions having a two-layer structure and the like may be employed. The average volume particle size of the resin fine particles composing the emulsion is preferably approximately 10 nm to approximately 200 nm, and particularly preferably approximately 50 nm to approximately 150 nm.

If the content of the aqueous resin emulsion is too low, the dispersibility and the fixability are unsatisfactory. Particularly, when the ink is printed on cloth, color fading occurs during washing. On the other hand, if the content is too high, the ejectability of the ink from an ink-jet head is lowered. Thus, in the present invention, the content of the aqueous resin emulsion is preferably approximately 6% to approximately 10% as a solid content.

Polyethylene glycol and diethylene glycol are employed as a viscosity modifier for the ink and also as a humectant which prevents drying of the ink for preventing ink clogging in an ink-jet head. As for polyethylene glycol, the larger the molecular weight thereof, the more frequent the occurrence of ejection failure in a nozzle. On the other hand, if the molecular weight is as large as approximately 600, solidification occurs at approximately 25° C. In this case, the ink adheres to a printing material stronger than an ink which is liquid at 25° C., and thus good fixability is obtained. Therefore, the molecular weight of polyethylene glycol is preferably approximately 200 to approximately 600.

The present invention is characterized in that the contents of polyethylene glycol and diethylene glycol satisfy the following formulae (1), (2) and (3):

$$A<15 \qquad (1)$$

$$A+B>10 \qquad (2)$$

$$30 \leq A \times \alpha + B \leq 64 \qquad (3)$$

wherein: A is the content of polyethylene glycol (%); B is the content of diethylene glycol (%); and α is the molecular weight ratio of polyethylene glycol to diethylene glycol.

By adjusting the content of polyethylene glycol to less than approximately 15% (formula (1)), and preferably to approximately 10% or less, the viscosity of the ink can be effectively increased without deteriorating the fixability.

By adjusting the total content of polyethylene glycol and diethylene glycol to more than approximately 10% (formula (2)) within the range satisfying the formula (3), the ink exhibits both excellent freezing resistance and excellent fixability. If the total content of polyethylene glycol and diethylene glycol is approximately 10% or less, the freezing resistance is not sufficient.

The reason for the improvement in both the freezing resistance and the fixability obtained by satisfying the formula (3) is unclear. It may be considered that a freezing point depression phenomenon due to an increase of the number of molecules in the solvent is related to the improvement. The relation between the formula (3) and both the freezing resistance and the fixability is a new finding discovered by the present inventors.

In the present invention, preferably, the contents of polyethylene glycol and diethylene glycol are properly determined within the range satisfying the formulae (1), (2) and (3) according to the kind of pigment and emulsion or the like. For example, the solid content of a black ink is normally larger than that of a color ink, and thus a black ink has a high viscosity even when polyethylene glycol or diethylene glycol is not added thereto. Therefore, the contents of polyethylene glycol and diethylene glycol in a black ink can be reduced as compared to that in a color ink.

In addition to the above-mentioned components, the ink of the present invention preferably contains pure water or ion exchanged water as an aqueous medium. Also, the ink of the present invention may contain a water-soluble organic solvent other than polyethylene glycol and diethylene glycol in accordance with need. Such a water-soluble organic solvent preferably has a boiling point lower than that of diethylene glycol. Examples of the water-soluble organic solvent include: glycols such as ethylene glycol, propylene glycol, 1,3-octylene glycol, dipropylene glycol, trimethylene glycol, hexylene glycol and the like; glycol ethers such as ethylene glycol monomethyl ether, ethylene glycol diethyl ether, ethylene glycol monobutyl ether, ethylene glycol dibutyl ether, ethylene glycol monoisopropyl ether, ethylene glycol monohexyl ether, glycerin dimethyl ether, glycerin diethyl ether, diethylene glycol ethyl methyl ether, diethylene glycol diethyl ether, diethylene glycol dimethyl ether, diethylene glycol monomethyl ether, diethylene glycol monobutyl ether, dipropylene glycol monoethyl ether, triethylene glycol dimethyl ether, tripropylene glycol monomethyl ether, propylene glycol monoethyl ether, propylene glycol monobutyl ether, propylene glycol monomethyl ether and the like; alcohols and polyalcohols such as ethanol, propanol, isopropanol, butanol, pentanol, hexanol, heptanol, octanol, nonanol, 1,2-butanediol, 1,3-butanediol, 1,4-butanediol, 1,4-butenediol and the like; and esters such as ethylene glycol diacetate, ethylene glycol monoacetate, ethylene glycol monoethyl ether acetate, ethylene glycol monobutyl ether acetate, ethylene glycol monomethyl ether acetate and the like. The above-mentioned water-soluble organic solvents may be employed in combination therewith.

In the ink for ink-jet recording, the content of these water-soluble organic solvents is preferably approximately 5% to approximately 50%. Particularly preferably, the ink for ink-jet recording satisfies the following formula (4):

$$30 \leq A \times \alpha + (B+C) \leq 64 \qquad (4)$$

wherein: A is the content of polyethylene glycol (%); B is the content of diethylene glycol (%); C is the content of water-soluble organic solvents (%), other than polyethylene glycol and diethylene glycol, having a boiling point lower than that of diethylene glycol; and α is the molecular weight ratio of polyethylene glycol to diethylene glycol.

In the ink of the present invention, an water-soluble solvent having a boiling point higher than that of diethylene glycol may be employed in addition to a water-soluble organic solvent having a boiling point lower than that of diethylene glycol, as long as it does not adversely affect the fixability. Examples of such a water-soluble organic solvent include: glycol ethers such as glycerin, triethylene glycol, tripropylene glycol, diethylene glycol dibutyl ether, triethylene glycol monoethyl ether, triethylene glycol monomethyl ether and the like; and esters such as glycerin 1,3-diacetate, glycerin triacetate, diethylene glycol monoacetate, diethylene glycol monobutyl ether acetate and the like.

Moreover, the ink of the present invention may contain additives including: viscosity modifiers such as polyvinyl alcohol, cellulose and the like; dispersing agents such as water soluble polymers, and the like; surfactants; pH modifiers; anti-forming agents; preservatives; and the like, in accordance with need.

The viscosity of the ink of the present invention is adjusted to preferably approximately 3 cP to approximately 20 cP, and particularly preferably, approximately 12 cP to approximately 14 cP, by use of the above-mentioned polyethylene glycol and diethylene glycol and also by use of a viscosity modifier added in accordance with need.

The method for producing the ink of the present invention preferably comprises: a first step of dispersing a pigment in an aqueous medium; and a second step of adding an aqueous emulsion, polyethylene glycol, and diethylene glycol to the dispersion obtained in the first step.

In the first step, the pigment is dispersed in the aqueous medium by means of a pulverizer or a disperser, and, if necessary, coarse particles are removed by means of centrifugation, filtration, or the like to thereby obtain the dispersion of the pigment. Examples of the pulverizer and the disperser include a ball mill, a bead mill, a sand mill, an attritor, a roll mill, an agitator mill, a Henschel mixer, a colloid mill, an ultrasonic homogenizer, a pearl mill, a jet mill, an Ang mill, and Mechanofusion (product of Hosokawa Micron Corporation).

In the second step, the aqueous resin emulsion, polyethylene glycol, and diethylene glycol are added to the dispersion of the pigment obtained in the first step. The obtained mixture is stirred to uniformly disperse the components and, if necessary, is filtrated to thereby obtain the ink.

Preferably, the additives are added in the second step in accordance with need.

The thus-obtained ink for ink-jet recording may be employed in a piezo-type ink-jet printer having a piezoelectric element employed in a printer head. Preferably, when an object is printed on a recording medium by use of the ink-jet printer, the printed object is fixed on the recording medium by subjecting the printed object to a heat treatment such as a heat treatment by means of a heat roll, a hot press, an iron or the like, a heat treatment by blowing hot air, a steam heat treatment and the like.

When the ink is ejected on cloth, the amount of ink droplet is preferably approximately 0 to approximately 50 pL/dot. In addition, the fixation is preferably performed by means of a hot press under the heating and pressing conditions of a temperature of approximately 130° C. to approximately 180° C. and a pressure of approximately 0.01 MPa or more for approximately 15 seconds to approximately 120 seconds.

Examples of the recording medium on which ink-jet printing can be performed by use of the ink of the present invention include: paper sheets such as plain paper, dedicated paper and the like; cloths such as woven fabrics, knitted fabrics, non-woven fabrics and the like; woods; corrugated cardboards; and the like. In particular, in terms of suitability for the heat fixation, cloths such as woven fabrics, knitted fabrics, non-woven fabrics and the like are preferable. No particular limitation is imposed on the fiber composing the cloth. Examples of the fiber include: natural fibers such as cotton, silk, hemp, sheep wool, and the like; synthetic fibers such as polyamide, polyester, acrylic and the like; regenerated and semisynthetic fibers such as rayon, acetate and the like; mixed fibers thereof; and the like. Further, examples of the preferred recording medium in terms of a feel to skin, water absorption properties, cost, availability, and the like include a white T-shirt textile made of 100% cotton.

EXAMPLES

The present invention will be specifically described by reference with the following Examples.

(1) Preparation of Inks

The following inks were prepared: yellow inks having compositions shown in Table 1; magenta inks having compositions shown in Table 2; cyan inks having compositions shown in Table 3; and black inks having compositions shown in Tables 4A, 4B and 4C.

In these inks, C. I. Pigment Yellow 74 was employed as a yellow pigment, and C. I. Pigment Red 122 was employed as a magenta pigment. Further, C. I. Pigment Blue 15:3 was employed as a cyan pigment, and C. I. Pigment Black 7 was employed as a black pigment.

In each of the color inks, the same pigment concentration (4%) and the same aqueous resin emulsion concentration (solid content: 8%) were employed. The composition of the inks for each of the colors was adjusted such that the total content of polyethylene glycol (PEG, molecular weight=400) and diethylene glycol (DEG) was 10%, 20%, 30%, 40%, 50% and 60% for each of polyethylene glycol contents of 0%, 5%, 10% and 15%.

In the black inks, a pigment concentration of 8% was employed, and, as in the color inks, the black inks having various compositions were prepared by use of PEG having a molecular weight of 400. Further, additional two groups of black inks were similarly prepared in which PEG having a molecular weight of 200 or 600 was employed in place of the PEG having a molecular weight of 400.

In the preparation of the ink, first, a pigment (20%), diethylene glycol (10%), and ion exchanged water (70%) were stirred for 30 minutes or longer to disperse the components by means of a disperser (Sand Grinder, product of Igarashi Kikai), thereby obtaining a pigment dispersion. To the obtained pigment dispersion were added an aqueous resin emulsion (acrylic resin, product name: Joncryl 1674 (solid content: 45%), product of Johnson Polymer Corporation), polyethylene glycol (PEG, molecular weight: 200, 400, or 600), and diethylene glycol (DEG, molecular weight: 106). The mixture was stirred for 5 minutes, and the resultant dispersion was filtrated under pressure with a 3 μm membrane filter or a 5 μm metal filter.

(2) Evaluation (2-1) Freezing Resistance

The ink (10 mL) of each of Test Examples was placed in a vessel and was allowed to stand for 30 minutes in a thermostatic bath maintained at −15° C. The freezing resistance was ranked by the following criteria.

A; The ink was not frozen.

B; The ink was frozen.

(2-2) Fixability

The ink of each of Test Examples was printed on a T-shirt made of 100% cotton at 600 dpi×600 dpi and a droplet amount of 40 pL/dot by means of an ink-jet printer. The printed T-shirt was subjected to a heat treatment for 30 seconds by means of a hot press set at a temperature of 130° C.

The obtained printed T-shirt was rubbed one reciprocal cycle with a plain T-shirt texture (a test piece) by means of a rubbing testing machine type II (Gakushin-type) stipulated in JIS 0849 (abrasion resistance tester, product of Imoto Machinery Co., Ltd.). Subsequently, the color staining density on the test piece was measured, and the fixability was ranked by the following criteria.

A: Less than 0.03

B: 0.03 or more and less than 0.04

C: 0.04 or more

The obtained results are shown in Tables 1 to 5D.

TABLE 1

Yellow ink
(Yellow pigment: 4%, aqueous resin emulsion (solid content): 8%)

(Unit: %)

| Test Example | PEG | DEG | PEG + DEG | Freezing resistance | Fixability |
|---|---|---|---|---|---|
| 1 | 0 | 10 | 10 | C | A |
| 2 | 0 | 20 | 20 | C | A |
| 3 | 0 | 30 | 30 | B | A |
| 4 | 0 | 40 | 40 | B | A |
| 5 | 0 | 50 | 50 | B | A |
| 6 | 0 | 60 | 60 | B | A |
| 7 | 5 | 5 | 10 | C | A |
| 8 | 5 | 15 | 20 | B | A |
| 9 | 5 | 25 | 30 | B | A |
| 10 | 5 | 35 | 40 | B | A |
| 11 | 5 | 45 | 50 | B | B |
| 12 | 5 | 55 | 60 | B | C |
| 13 | 10 | 0 | 10 | (*1) | |
| 14 | 10 | 10 | 20 | B | A |
| 15 | 10 | 20 | 30 | B | A |
| 16 | 10 | 30 | 40 | B | A |
| 17 | 10 | 40 | 50 | B | C |
| 18 | 10 | 50 | 60 | B | C |
| 19 | 15 | −5 | 10 | (*2) | |
| 20 | 15 | 5 | 20 | B | C |
| 21 | 15 | 15 | 30 | B | C |
| 22 | 15 | 25 | 40 | B | C |
| 23 | 15 | 35 | 50 | B | C |
| 24 | 15 | 45 | 60 | B | C |

(*1) Since the pigment dispersion contained DEG, an ink containing a predetermined amount of DEG could not be prepared.
(*2) When the content of PEG was 15%, an ink containing 10% of "PEG + DEG" could not be prepared.

TABLE 2

Magenta ink
(Magenta pigment: 4%, aqueous resin emulsion (solid content): 8%)

(Unit: %)

| Test Example | PEG | DEG | PEG + DEG | Freezing resistance | Fixability |
|---|---|---|---|---|---|
| 1 | 0 | 10 | 10 | C | A |
| 2 | 0 | 20 | 20 | C | A |
| 3 | 0 | 30 | 30 | B | A |
| 4 | 0 | 40 | 40 | B | A |
| 5 | 0 | 50 | 50 | B | A |
| 6 | 0 | 60 | 60 | B | A |
| 7 | 5 | 5 | 10 | C | A |
| 8 | 5 | 15 | 20 | B | A |
| 9 | 5 | 25 | 30 | B | A |
| 10 | 5 | 35 | 40 | B | A |
| 11 | 5 | 45 | 50 | B | B |
| 12 | 5 | 55 | 60 | B | C |
| 13 | 10 | 0 | 10 | (*1) | |
| 14 | 10 | 10 | 20 | B | A |
| 15 | 10 | 20 | 30 | B | A |
| 16 | 10 | 30 | 40 | B | A |
| 17 | 10 | 40 | 50 | B | C |
| 18 | 10 | 50 | 60 | B | C |
| 19 | 15 | −5 | 10 | (*2) | |
| 20 | 15 | 5 | 20 | B | C |
| 21 | 15 | 15 | 30 | B | C |
| 22 | 15 | 25 | 40 | B | C |
| 23 | 15 | 35 | 50 | B | C |
| 24 | 15 | 45 | 60 | B | C |

(*1) Since the pigment dispersion contained DEG, an ink containing a predetermined amount of DEG could not be prepared.
(*2) When the content of PEG was 15%, an ink containing 10% of "PEG + DEG" could not be prepared.

TABLE 3

Cyan ink
(Cyan pigment: 4%, aqueous resin emulsion (solid content): 8%)

(Unit: %)

| Test Example | PEG | DEG | PEG + DEG | Freezing resistance | Fixability |
|---|---|---|---|---|---|
| 1 | 0 | 10 | 10 | C | A |
| 2 | 0 | 20 | 20 | C | A |
| 3 | 0 | 30 | 30 | B | A |
| 4 | 0 | 40 | 40 | B | A |
| 5 | 0 | 50 | 50 | B | A |
| 6 | 0 | 60 | 60 | B | A |
| 7 | 5 | 5 | 10 | C | A |
| 8 | 5 | 15 | 20 | B | A |
| 9 | 5 | 25 | 30 | B | A |
| 10 | 5 | 35 | 40 | B | A |
| 11 | 5 | 45 | 50 | B | B |
| 12 | 5 | 55 | 60 | B | C |
| 13 | 10 | 0 | 10 | (*1) | |
| 14 | 10 | 10 | 20 | B | A |
| 15 | 10 | 20 | 30 | B | A |
| 16 | 10 | 30 | 40 | B | C |
| 17 | 10 | 40 | 50 | B | C |
| 18 | 10 | 50 | 60 | B | C |
| 19 | 15 | −5 | 10 | (*2) | |
| 20 | 15 | 5 | 20 | B | C |
| 21 | 15 | 15 | 30 | B | C |
| 22 | 15 | 25 | 40 | B | C |
| 23 | 15 | 35 | 50 | B | C |
| 24 | 15 | 45 | 60 | B | C |

(*1) Since the pigment dispersion contained DEG, an ink containing a predetermined amount of DEG could not be prepared.
(*2) When the content of PEG was 15%, an ink containing 10% of "PEG + DEG" could not be prepared.

TABLE 4A

Black ink
(Black pigment: 8%, aqueous resin emulsion (solid content): 9.5%, molecular weight of PEG: 200)

(Unit: %)

| Test Example | PEG | DEG | PEG + DEG | Freezing resistance | Fixability |
|---|---|---|---|---|---|
| 1 | 0 | 10 | 10 | C | A |
| 2 | 0 | 20 | 20 | C | A |
| 3 | 0 | 30 | 30 | B | A |
| 4 | 0 | 40 | 40 | B | A |
| 5 | 0 | 50 | 50 | (*1) | |
| 6 | 0 | 60 | 60 | (*1) | |
| 7 | 5 | 5 | 10 | C | A |
| 8 | 5 | 15 | 20 | B | A |
| 9 | 5 | 25 | 30 | B | A |
| 10 | 5 | 35 | 40 | B | B |
| 11 | 5 | 45 | 50 | (*1) | |
| 12 | 5 | 55 | 60 | (*1) | |
| 13 | 10 | 0 | 10 | (*2) | |
| 14 | 10 | 10 | 20 | B | A |
| 15 | 10 | 20 | 30 | B | A |
| 16 | 10 | 30 | 40 | B | A |
| 17 | 10 | 40 | 50 | (*1) | |
| 18 | 10 | 50 | 60 | (*1) | |
| 19 | 15 | −5 | 10 | (*2) | |
| 20 | 15 | 5 | 20 | B | A |
| 21 | 15 | 15 | 30 | B | B |
| 22 | 15 | 25 | 40 | B | B |
| 23 | 15 | 35 | 50 | (*1) | |
| 24 | 15 | 45 | 60 | (*1) | |

(*1) 40% of the pigment dispersion (pigment solid content: 20%) and 21% of the aqueous resin emulsion (solid content: 45%) must be blended in order to prepare an ink containing 8% of the pigment and 9.5% of the aqueous resin emulsion(solid content). Therefore, the maximum content of PEG + DEG was 39%, and the content of "PEG + DEG" could not be adjusted to a predetermined value.
(*2) Since the pigment dispersion contained DEG, an ink containing a predetermined amount of DEG could not be prepared.

TABLE 4B

Black ink
(Black pigment: 8%, aqueous resin emulsion (solid content):
9.5%, molecular weight of PEG: 400)

(Unit: %)

| Test Example | PEG | DEG | PEG + DEG | Freezing resistance | Fixability |
|---|---|---|---|---|---|
| 1 | 0 | 10 | 10 | C | A |
| 2 | 0 | 20 | 20 | C | A |
| 3 | 0 | 30 | 30 | B | A |
| 4 | 0 | 40 | 40 | B | A |
| 5 | 0 | 50 | 50 | (*1) | |
| 6 | 0 | 60 | 60 | (*1) | |
| 7 | 5 | 5 | 10 | C | A |
| 8 | 5 | 15 | 20 | B | A |
| 9 | 5 | 25 | 30 | B | A |
| 10 | 5 | 35 | 40 | B | A |
| 11 | 5 | 45 | 50 | (*1) | |
| 12 | 5 | 55 | 60 | (*1) | |
| 13 | 10 | 0 | 10 | (*2) | |
| 14 | 10 | 10 | 20 | B | A |
| 15 | 10 | 20 | 30 | B | A |
| 16 | 10 | 30 | 40 | B | B |
| 17 | 10 | 40 | 50 | (*1) | |
| 18 | 10 | 50 | 60 | (*1) | |
| 19 | 15 | −5 | 10 | (*2) | |
| 20 | 15 | 5 | 20 | B | C |
| 21 | 15 | 15 | 30 | B | C |
| 22 | 15 | 25 | 40 | B | C |
| 23 | 15 | 35 | 50 | (*1) | |
| 24 | 15 | 45 | 60 | (*1) | |

(*1) 40% of the pigment dispersion (pigment solid content: 20%) and 21% of the aqueous resin emulsion (solid content: 45%) must be blended in order to prepare an ink containing 8% of the pigment and 9.5% of the aqueous resin emulsion (solid content). Therefore, the maximum content of PEG + DEG was 39%, and the content of "PEG + DEG" could not be adjusted to a predetermined value.
(*2) Since the pigment dispersion contained DEG, an ink containing a predetermined amount of DEG could not be prepared.

TABLE 4C

Black ink
(Black pigment: 8%, aqueous resin emulsion (solid content):
9.5%, molecular weight of PEG: 600)

(Unit: %)

| Test Example | PEG | DEG | PEG + DEG | Freezing resistance | Fixability |
|---|---|---|---|---|---|
| 1 | 0 | 10 | 10 | C | A |
| 2 | 0 | 20 | 20 | C | A |
| 3 | 0 | 30 | 30 | B | A |
| 4 | 0 | 40 | 40 | B | A |
| 5 | 0 | 50 | 50 | (*1) | |
| 6 | 0 | 60 | 60 | (*1) | |
| 7 | 5 | 5 | 10 | C | A |
| 8 | 5 | 15 | 20 | B | A |
| 9 | 5 | 25 | 30 | B | A |
| 10 | 5 | 35 | 40 | B | A |
| 11 | 5 | 45 | 50 | (*1) | |
| 12 | 5 | 55 | 60 | (*1) | |
| 13 | 10 | 0 | 10 | (*2) | |
| 14 | 10 | 10 | 20 | B | A |
| 15 | 10 | 20 | 30 | B | A |
| 16 | 10 | 30 | 40 | B | A |
| 17 | 10 | 40 | 50 | (*1) | |
| 18 | 10 | 50 | 60 | (*1) | |
| 19 | 15 | −5 | 10 | (*2) | |
| 20 | 15 | 5 | 20 | B | A |
| 21 | 15 | 15 | 30 | B | B |
| 22 | 15 | 25 | 40 | B | C |
| 23 | 15 | 35 | 50 | (*1) | |
| 24 | 15 | 45 | 60 | (*1) | |

(*1) 40% of the pigment dispersion (pigment solid content: 20%) and 21% of the aqueous resin emulsion (solid content: 45%) must be blended in order to prepare an ink containing 8% of the pigment and 9.5% of the aqueous resin emulsion (solid content). Therefore, the maximum content of PEG + DEG was 39%, and the content of "PEG + DEG" could not be adjusted to a predetermined value.
(*2) Since the pigment dispersion contained DEG, an ink containing a predetermined amount of DEG could not be prepared.

The results shown in Tables 1 to 4 are summarized on the above-mentioned formula (3) and shown in 5A to 5D.

$$30 \leq A \times \alpha + B \leq 64 \tag{3}$$

wherein: A is the content of PEG (%); B is the content of DEG (%); $\alpha=1.9$ (200 (the molecular weight of PEG)/106 (the molecular weight of DEG)), $\alpha=3.8$ (400 (the molecular weight of PEG)/106 (the molecular weight of DEG)), or $\alpha=5.7$ (600 (the molecular weight of PEG)/106 (the molecular weight of DEG))).

TABLE 5A

| | | | | Black | |
|---|---|---|---|---|---|
| Test Example | 1.9 A + B | A (M.W. 200) | B | Freezing resistance | Fixability |
| 1 | 10 | 0 | 10 | C | A |
| 7 | 14.5 | 5 | 5 | C | A |
| 13 | 19 | 10 | 0 | — | — |
| 2 | 20 | 0 | 20 | C | A |
| 8 | 24.5 | 5 | 15 | B | A |
| 14 | 29 | 10 | 10 | B | A |
| 3 | 30 | 0 | 30 | B | A |
| 9 | 34.5 | 5 | 25 | B | A |
| 15 | 39 | 10 | 20 | B | A |
| 4 | 40 | 0 | 40 | B | A |
| 10 | 44.5 | 5 | 35 | B | B |
| 16 | 49 | 10 | 30 | B | A |
| 5 | 50 | 0 | 50 | — | — |
| 11 | 54.5 | 5 | 45 | — | — |
| 17 | 59 | 10 | 40 | — | — |
| 6 | 60 | 0 | 60 | — | — |
| 12 | 64.5 | 5 | 55 | — | — |
| 18 | 69 | 10 | 50 | — | — |

TABLE 5B

| | | | | Black | |
|---|---|---|---|---|---|
| Test Example | 3.8 A + B | A (M.W. 200) | B | Freezing resistance | Fixability |
| 1 | 10 | 0 | 10 | C | A |
| 2 | 20 | 0 | 20 | C | A |
| 7 | 24 | 5 | 5 | C | A |
| 3 | 30 | 0 | 30 | B | A |
| 8 | 34 | 5 | 15 | B | A |
| 13 | 38 | 10 | 0 | — | — |
| 4 | 40 | 0 | 40 | B | A |
| 9 | 44 | 5 | 25 | B | A |
| 14 | 48 | 10 | 10 | B | A |
| 5 | 50 | 0 | 50 | — | — |
| 10 | 54 | 5 | 35 | B | A |
| 15 | 58 | 10 | 20 | B | A |
| 6 | 60 | 0 | 60 | — | — |
| 11 | 64 | 5 | 45 | — | — |

TABLE 5B-continued

| | | | | Black | |
|---|---|---|---|---|---|
| Test Example | 3.8 A + B | A (M.W. 200) | B | Freezing resistance | Fixability |
| 16 | 68 | 10 | 30 | B | B |
| 12 | 74 | 5 | 55 | — | — |
| 17 | 78 | 10 | 40 | — | — |
| 18 | 88 | 10 | 50 | — | — |

TABLE 5C

| | | | | Black | |
|---|---|---|---|---|---|
| Test Example | 5.7 A + B | A (M.W. 200) | B | Freezing resistance | Fixability |
| 1 | 10 | 0 | 10 | C | A |
| 2 | 20 | 0 | 20 | C | A |
| 3 | 30 | 0 | 30 | B | A |
| 7 | 33.5 | 5 | 5 | C | A |
| 4 | 40 | 0 | 40 | B | A |
| 8 | 43.5 | 5 | 15 | B | A |
| 5 | 50 | 0 | 50 | — | — |
| 9 | 53.5 | 5 | 25 | B | A |
| 13 | 57 | 10 | 0 | — | — |
| 6 | 60 | 0 | 60 | — | — |
| 10 | 63.5 | 5 | 35 | B | A |
| 14 | 67 | 10 | 10 | B | A |
| 11 | 73.5 | 5 | 45 | — | — |
| 15 | 77 | 10 | 20 | B | A |
| 12 | 83.5 | 5 | 55 | — | — |
| 16 | 87 | 10 | 30 | B | B |
| 17 | 97 | 10 | 40 | — | — |
| 18 | 107 | 10 | 50 | — | — |

TABLE 5D

| | | | | Yellow | | Magenta | | Cyan | | Black | |
|---|---|---|---|---|---|---|---|---|---|---|---|
| Test Example | 3.8 A + B | A | B | Freezing resistance | Fixability | Freezing resistance | Fixability | Freezing resistance | Fixability | Freezing resistance | Fixability |
| 1 | 10 | 0 | 10 | C | A | C | A | C | A | C | A |
| 2 | 20 | 0 | 20 | C | A | C | A | C | A | C | A |
| 7 | 24 | 5 | 5 | C | A | C | A | C | A | C | A |
| 3 | 30 | 0 | 30 | B | A | B | A | B | A | B | A |
| 8 | 34 | 5 | 15 | B | A | B | A | B | A | B | A |
| 13 | 38 | 10 | 0 | — | — | — | — | — | — | — | — |
| 4 | 40 | 0 | 40 | B | A | B | A | B | A | B | A |
| 9 | 44 | 5 | 25 | B | A | B | A | B | A | B | A |
| 14 | 48 | 10 | 10 | B | A | B | A | B | A | B | A |
| 5 | 50 | 0 | 50 | B | A | B | — | B | A | — | — |
| 10 | 54 | 5 | 35 | B | A | B | A | B | A | B | A |
| 15 | 58 | 10 | 20 | B | A | B | A | B | A | B | A |
| 6 | 60 | 0 | 60 | B | A | B | — | B | A | — | — |
| 11 | 64 | 5 | 45 | B | B | B | — | B | B | — | — |
| 16 | 68 | 10 | 30 | B | A | B | B | B | C | B | B |
| 12 | 74 | 5 | 55 | B | C | B | — | B | C | — | — |
| 17 | 78 | 10 | 40 | B | C | B | — | B | C | — | — |
| 18 | 88 | 10 | 50 | B | C | B | — | B | C | — | — |

As can be seen from Tables 1 to 4C, the deterioration of the fixability depends on the content of polyethylene glycol. Also, even when the content of polyethylene glycol is low, the fixability is deteriorated when the content of diethylene glycol is too high (see Test Example 12). In addition, the higher the content of polyethylene glycol and diethylene glycol, the better the freezing resistance.

As can be seen from Tables 5A to 5D, in the range where the formula (3) is satisfied (the shaded range in Tables 5A to 5D), both the freezing resistance and the fixability are excellent when the formula (2) is satisfied.

The ink of the present invention can be employed as an ink for performing ink-jet-recording on various recording mediums including cloth.

The entire disclosure of the specification, claims and summary of Japanese Patent Application No. 2005-66405 filed on Mar. 9, 2005 is hereby incorporated by reference.

What is claimed is:

1. An ink for ink-jet recording comprising:
a pigment;
an aqueous resin emulsion;
a polyethylene glycol; and
diethylene glycol;
wherein the following formulae (1), (2) and (3) are satisfied:

$$A<15 \tag{1}$$

$$A+B>10 \tag{2}$$

$$30 \leq A \times \alpha + B \leq 64 \tag{3}$$

wherein:
A is a content of polyethylene glycol (mass % by mass of the ink);
B is a content of diethylene glycol (mass % by mass of the ink); and
α is a molecular weight ratio of polyethylene glycol to diethylene glycol; and
wherein the aqueous resin emulsion is present, as a resin solid content, in an amount of from 6 mass % to 10 mass %, inclusive, by mass of the ink.

2. The ink for ink-jet recording according to claim 1; wherein A is less than 10.

3. The ink for ink-jet recording according to claim 1; wherein the polyethylene glycol has an average molecular weight of 200 to 600.

4. The ink for ink-jet recording according to claim 1, further comprising:
a water-soluble organic solvent, other than polyethylene glycol and diethylene glycol, having a boiling point lower than that of diethylene glycol.

5. The ink for ink-jet recording according to claim 4; wherein the ink for ink-jet recording satisfies the following formula (4)

$$30 \leq A \times \alpha + (B+C) \leq 64 \quad (4)$$

wherein C is a content of the water-soluble organic solvent.

6. The ink for ink-jet recording according to claim 1; wherein the pigment is a black pigment in an amount of approximately 6 mass % to approximately 10 mass % by mass of the ink.

7. The ink for ink-jet recording according to claim 1; wherein the pigment is a yellow pigment, a magenta pigment, or a cyan pigment in an amount of approximately 3 mass % to approximately 5 mass % by mass of the ink.

8. The ink for ink-jet recording according to claim 1; wherein the aqueous resin emulsion comprises an emulsion containing a resin with a glass transition point of approximately 0° C. or lower.

9. The ink for ink-jet recording according to claim 1; wherein the ink for ink-jet recording is printed onto a cloth.

10. A method for ink-jet printing onto a cloth comprising:
ejecting the ink for ink-jet recording according to claim 1 onto the cloth; and
fixing the ink on the cloth by heat treatment.

\* \* \* \* \*